US012608711B2

(12) United States Patent
Jammalamadaka et al.

(10) Patent No.:  US 12,608,711 B2
(45) Date of Patent:       Apr. 21, 2026

(54) THIRD PARTY VENDOR FRAUD RISK ASSESSMENT USING SHAPLEY ADDITIVE EXPLANATIONS FOR VALUE ATTRIBUTION

(71) Applicant: Dell Products L.P., Round Rock, TX (US)

(72) Inventors: Krishna Ravali Jammalamadaka, Bengaluru (IN); Sivaram Lakshminarayanan, Bangalore (IN); Srivats Athindran, Chennai (IN)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/759,940

(22) Filed: Jun. 30, 2024

(65) Prior Publication Data

US 2026/0004303 A1      Jan. 1, 2026

(51) Int. Cl.
*G06Q 20/40*          (2012.01)
(52) U.S. Cl.
CPC ................................. *G06Q 20/4016* (2013.01)
(58) Field of Classification Search
CPC .... G06Q 20/4016; G06Q 10/06; G06Q 10/10; G06Q 20/4014; G06Q 20/40
See application file for complete search history.

(56) References Cited

U.S. PATENT DOCUMENTS

| | | | | |
|---|---|---|---|---|
| 2023/0111445 A1* | 4/2023 | Ranjan | ............... | G06Q 20/4016 |
| | | | | 705/318 |
| 2023/0214813 A1* | 7/2023 | Mattison | .............. | G06Q 20/227 |
| | | | | 705/39 |
| 2023/0267468 A1* | 8/2023 | Tholar | .................. | G06Q 90/00 |
| | | | | 706/12 |

* cited by examiner

*Primary Examiner* — Hao Fu
(74) *Attorney, Agent, or Firm* — Chamberlain, Hrdlicka, White, Williams & Aughtry; Aly Z. Dossa

(57)          ABSTRACT

A method for managing value attribution for a data system includes obtaining, by the data system, order data associated with a plurality of data vendors, wherein the order data comprises variables about client devices, in response to obtaining the order data: applying the variables in the order data to a classification model to obtain fraud prediction models, performing an explainable mechanism on the fraud classification predictions using a shapley additive explanation (SHAP) to obtain localized SHAP values, applying a set of custom transformations to obtain normalized features, applying a value attribution algorithm on the normalized features using vendor information associated with the order data to obtain vendor values each associated with one of the plurality of data vendors, and performing a vendor remediation on the plurality of data vendors based on the obtained vendor values.

20 Claims, 5 Drawing Sheets

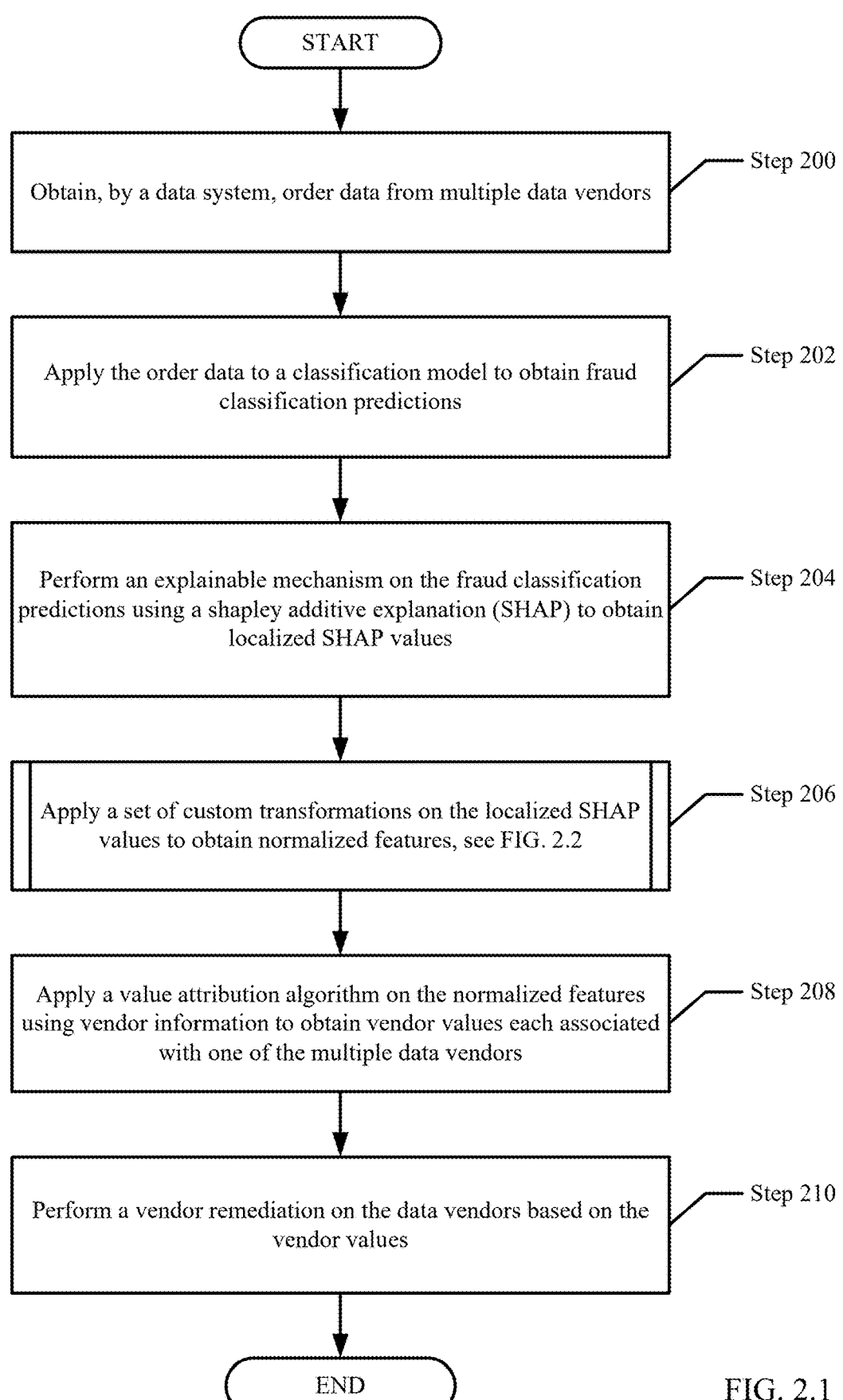

START

Obtain, by a data system, order data from multiple data vendors — Step 200

Apply the order data to a classification model to obtain fraud classification predictions — Step 202

Perform an explainable mechanism on the fraud classification predictions using a shapley additive explanation (SHAP) to obtain localized SHAP values — Step 204

Apply a set of custom transformations on the localized SHAP values to obtain normalized features, see FIG. 2.2 — Step 206

Apply a value attribution algorithm on the normalized features using vendor information to obtain vendor values each associated with one of the multiple data vendors — Step 208

Perform a vendor remediation on the data vendors based on the vendor values — Step 210

END

THIRD PARTY VENDOR FRAUD RISK ASSESSMENT USING SHAPLEY ADDITIVE EXPLANATIONS FOR VALUE ATTRIBUTION

BACKGROUND

Credit card fraud is a potential negative impact for transaction operations between parties. Credit card frauds, if not prevented, can hurt the bottom-line with revenue and margin loss and also have a negative impact on customer experience. Businesses may rely upon a rules-based framework in place to handle fraud risk assessment of orders placed on their respective e-commerce platforms by the aforementioned customer segments. The rules take into account a variety of variables or features in assessing the fraud risk of a transaction and help in a 'Go/No-Go/Hold & Manually Investigate' (Green/Red/Amber) decision.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.2 shows a flowchart of a method of implementing a set of custom transformations in accordance with one or more embodiments of the invention.

DETAILED DESCRIPTION

Figure 1:
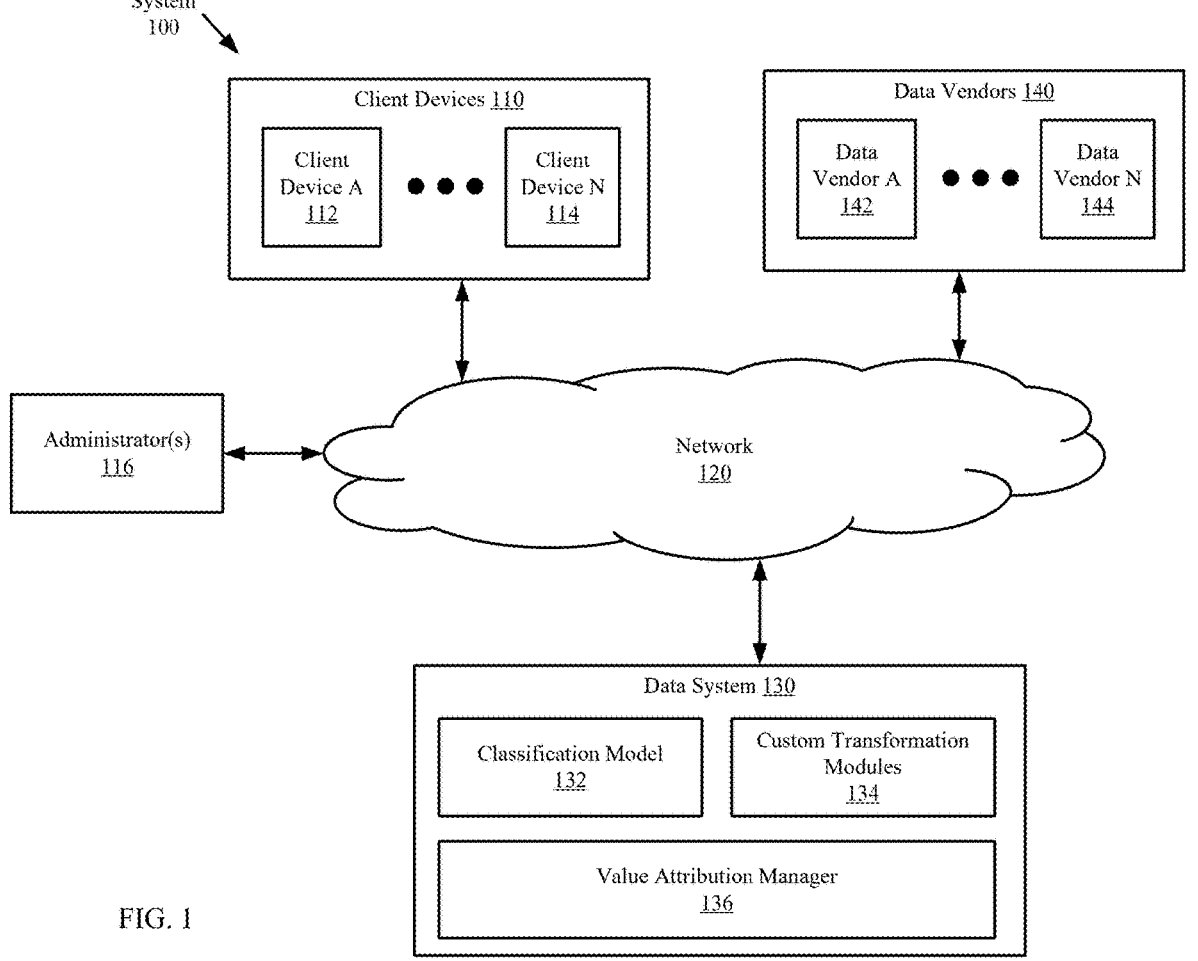
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein present a novel approach of leveraging a machine learning classification model trained on past order data on a business ecommerce website and using an explainable artificial intelligence (AI) framework such as, for example, Shapley Additive Explanations (SHAP) on top of the trained classification model to derive localized SHAP values which aid in determining the exact contribution of each of a large set of features that are used for the fraud prediction. These contributions are then passed through context specific transformation and aggregation steps to then derive a fair attribution of value from each of the data vendors that provide the order data.

Embodiments of the invention include applying the classification model on the order data to obtain fraud predictions for each order, generating explainability plots for each fraud prediction to obtain the features that may contribute to the fraud prediction, applying a set of custom transformations to the explainability plots to obtain normalized features, and determining vendor values for each data vendor based on the normalized vendors, and modifying, based on the vendor values, resources allocated to each data vendor.

The following describes various embodiments of the invention.

FIG. 1 shows a system in accordance with one or more embodiments of the invention. The system (100) includes any number of client devices (110), data vendors (140), administrators (116) of a business, a network (120), and a data system (130). The system (100) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the data system (130) may provide computer-implemented services to users. The computer-implemented services may include obtaining order data from data vendors (140) and processing the data vendors to obtain value attribution for each of the data vendors (142, 144). In one or more embodiments, the order data comprises information about transactions made between the client devices (110) and the administrators (116) for money in return for products provided by the business managed by the administrators (116). The information included in the order data includes, for example, a credit card number, or other account number, used for the transaction, a timestamp of the transaction, any information about the user performing the transaction obtained by a data vendor (142, 144), and/or any other information without departing from the invention.

To perform the aforementioned functionality, the data system (130) includes a value attribution manager (136) that obtains the order data and processes the data by applying the order data to a classification model (132) of the data system (130). The classification model (132) is a function that may obtain features of the order data and outputs a prediction about whether the order is fraudulent. The features may be pre-processed data generated by each of the data vendors (142, 144) that process information such as personally identifiable information (PII) of the users. The order may be fraudulent if money is not going to transfer to the business in exchange for a provided product. The order may be fraudulent if, for example, the account used for the order will not provide the required funds to properly complete the transaction. Such fraudulence may cost the business money. As such, it is beneficial for the business to use the classification model (132) to detect such fraudulence and respond accordingly. The order data provided by the data vendors (140) may aid in detecting such fraudulence. As such, each data vendor (142, 144) may be compensated via resources provided to each data vendor (140) by the data system (130) to collect such order data.

The classification model (132) in response to an input of order data, outputs fraud classification predictions. The order data may be further processed with the fraud classification predictions with one or more custom transformation modules (134) (further discussed in FIG. 2.2) to obtain normalized features, which may be used for further processing by the value attribution manager (136). Any processing of the order data may be performed, for example, in accordance with the methods of FIGS. 2.1-2.2.

Figure 4:
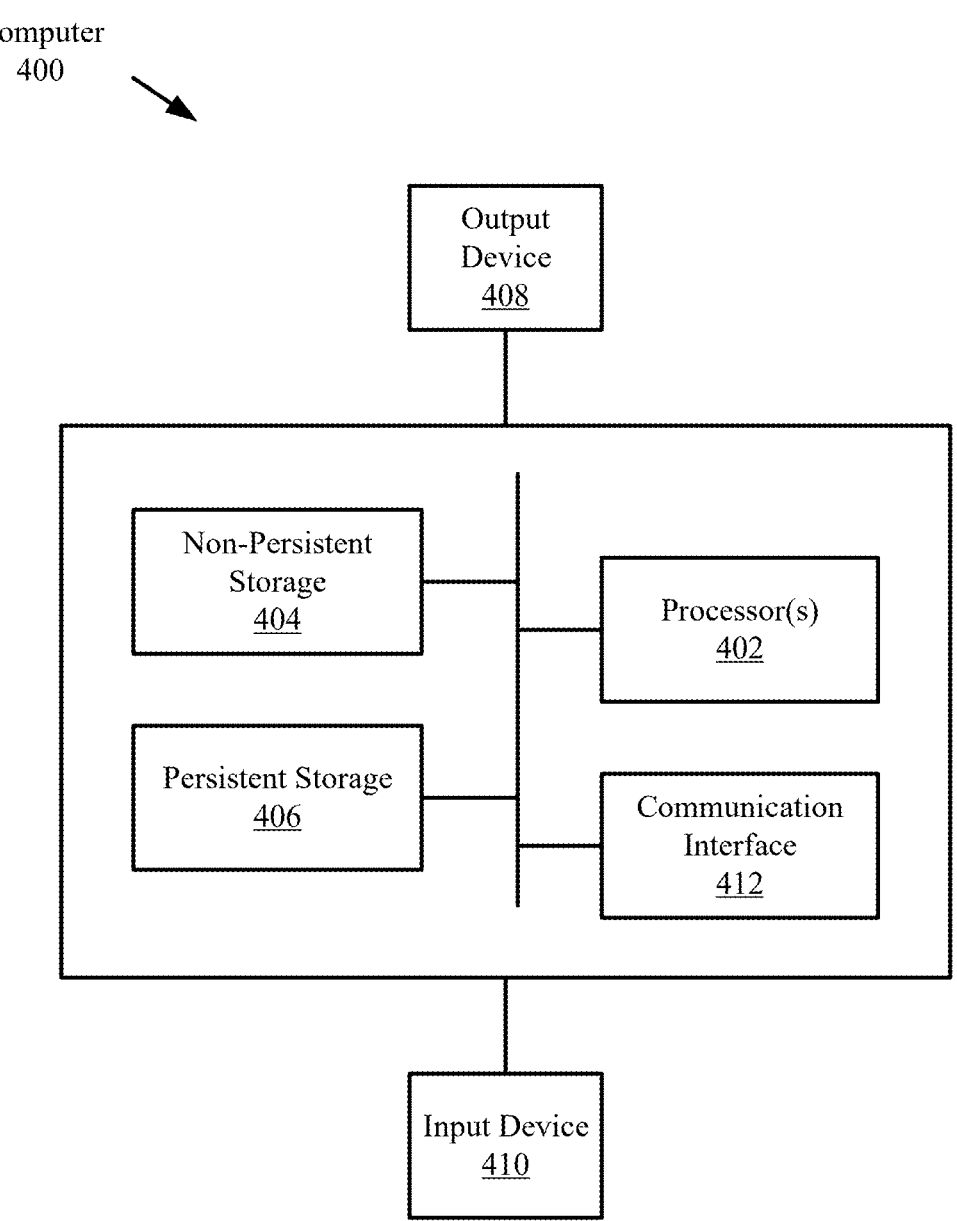
FIG. 4 shows a diagram of a computing device in accordance with one or more embodiments of the invention.

In one or more embodiments of the invention, the data system (130) (and/or any components illustrated within) may be implemented as a computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data system (130) (and/or any components illustrated within) described throughout this present disclosure.

Alternatively, in one or more embodiments of the invention, the data system (130) (and/or any components illustrated within) may be implemented as logical devices. A logical device may utilize the computing resources of any number of computing devices to provide the functionality of the data system (130) (and/or any components illustrated within) described throughout this present disclosure.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

Figure 2:
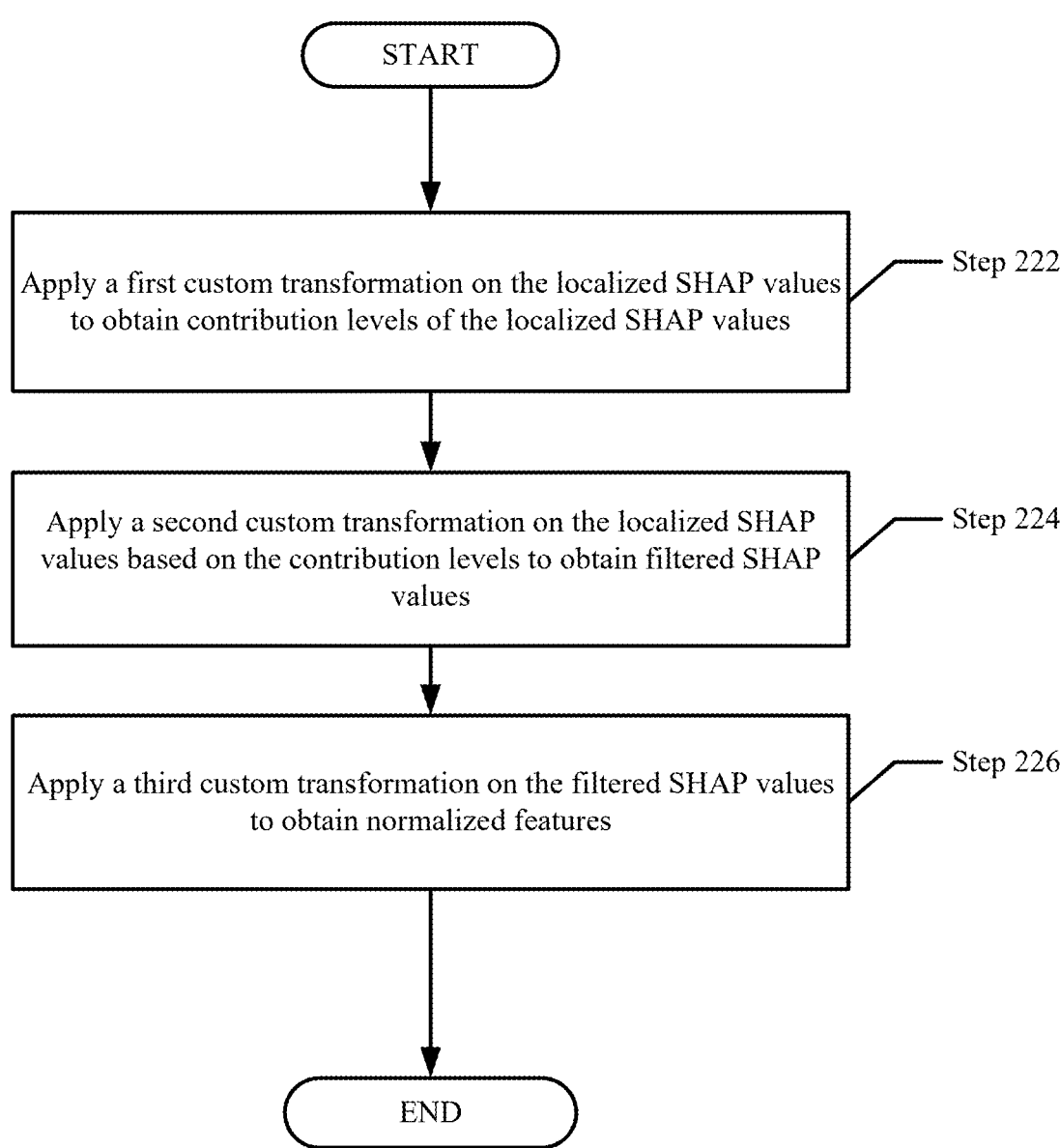
FIG. 2.1 shows a flowchart of a method of value attribution to a set of data vendors in accordance with one or more embodiments of the invention.

FIG. 2.1 shows a flowchart of a method of value attribution to a set of data vendors in accordance with one or more embodiments of the invention. The method shown in FIG. 2.1 may be performed by, for example, a data system (130, FIG. 1). Other components of the system in FIG. 1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, order data is obtained from multiple data vendors. As discussed above, the order data may include information about previous transactions performed, including any number of features that may, in any amount, impact the determination that a transaction is deemed fraudulent by a classification model. Each data vendor may provide various sets of features in the order data.

In step 202, the order data is applied to a classification model to obtain fraud classification predictions. In one or more embodiments, the fraud classification predictions specify whether an order is deemed fraudulent, and/or a degree of certainty for such determination. The classification model may process the features of the order data to obtain the fraud classification predictions.

In step 204, an explainable mechanism is applied on the fraud classification predictions and the order data using a shapley additive explanation (SHAP) to obtain localized SHAP values. In one or more embodiments, the explainable mechanism includes determining a SHAP value for each feature to determine the impact such feature incurred on the determination about whether the corresponding order was deemed fraudulent. For example, one feature may include a geographical location about where the user initiated the transaction for one order. If the user is not known to be at this geographical location, this feature of the order may have a SHAP value in the direction towards the determination that the order may be fraudulent, as it is likely that the user is hacked by a malicious entity, and this malicious entity is attempting to perform a fraudulent transaction.

In one or more embodiments, the SHAP values are generated by generating an explainability plot for each order.

The explainability plot is a data structure that specifies each feature and its localized SHAP value. Collectively, the localized SHAP values of all features for an order are used to generate the fraud classification prediction. For example, a set of SHAP values for an order may add to a numerical value. Based on the classification model, the numerical value may represent a fraudulent or a non-fraudulent order.

In step 206, a set of custom transformations are applied on the localized SHAP values. In one or more embodiments, the custom transformations may include a filtering of the features based on the SHAP values, a transformation of the SHAP values relative to other filtered SHAP values, and a normalization of the filtered SHAP values to represent an impact of a feature relative to the filtered features of the filtered SHAP values. For additional details regarding the custom transformations, refer to FIG. 2.2. The result of applying the set of custom transformations is a set of normalized features.

In step 208, a value attribution algorithm is applied on the normalized features using vendor information to obtain vendor values; each associated with one of the multiple data vendors. In one or more embodiments, the value attribute algorithm includes assigning each normalized feature to a corresponding data vendor that provided the normalized feature, determining a benefit of a given normalized feature (e.g., an amount of saved costs from detecting fraud for the normalized feature), identifying a cost of obtaining the normalized feature from the data vendor, and using the determined benefit and cost to calculate a vendor value for each of the data vendors. The vendor value may be generated by using vendor information to determine a corresponding data vendor for each normalized feature. The vendor value may represent, for example, a monetary value based on the money saved from providing certain features used to detect fraudulence. A return on investment for each data vendor may be represented, for example, as a ratio of the saved money to the cost to obtain such features from the respective data vendors. The aforementioned costs may be represented, for example, as monetary costs (e.g., subscription to a service provided by each data vendor, a transaction to obtain certain features in the order data, etc.). Alternatively, the costs may be represented as computing resources provided by the data system (e.g., memory, network bandwidth, etc.) to acquire, by the data vendors, the features associated with the orders and/or the clients.

In step 210, a vendor remediation is performed on the data vendors based on the vendor values. In one or more embodiments, the remediation includes reallocating resources to each data vendor based on the obtained vendor values. The resources may be, for example, computing resources provided to each data vendor by the data system. Alternatively, the resources may be monetary payment provided to the data vendors for future order data and feature collection. On data vendors with a high vendor value or high return on investment, the allocated resources may be allocated. Conversely, for data vendors in which the vendor values and/or return on investment are significantly low, the allocated resources may be reduced.

FIG. 2.2 shows a flowchart of a method of implementing a set of custom transformations in accordance with one or more embodiments of the invention. The method shown in FIG. 2.2 may be performed by, for example, the data system (130, FIG. 1). Other components of the system in FIG. 1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

Turning to FIG. 2.2, in step 222, a first custom transformation is applied on the localized SHAP values to obtain contribution levels of the localized SHAP values. In one or more embodiments, the first custom transformation is defined using a formula as follows: contribution level of individual feature in an order=corresponding localized SHAP value/absolute value of the SHAP value for the order in log odds. In one or more embodiments, the log odds is a function that applies a logarithmic function on a probability of an event (e.g., the feature). The probability of the feature may be a probability of the feature impacting the order relative to all features of the order.

In step 224, a second custom transformation is applied on the localized SHAP values based on the contribution levels to obtain filtered SHAP values. In one or more embodiments, the second custom transformation includes filtering the localized SHAP values based on the ones that have a positive value of the contribution level generated in step 220.

In step 226, a third custom transformation is applied on the filtered SHAP values to obtain the normalized features. In one or more embodiments, the normalized features are each calculated as a percentage of a filtered SHAP value relative to the sum of all filtered SHAP values.

Figure 3:
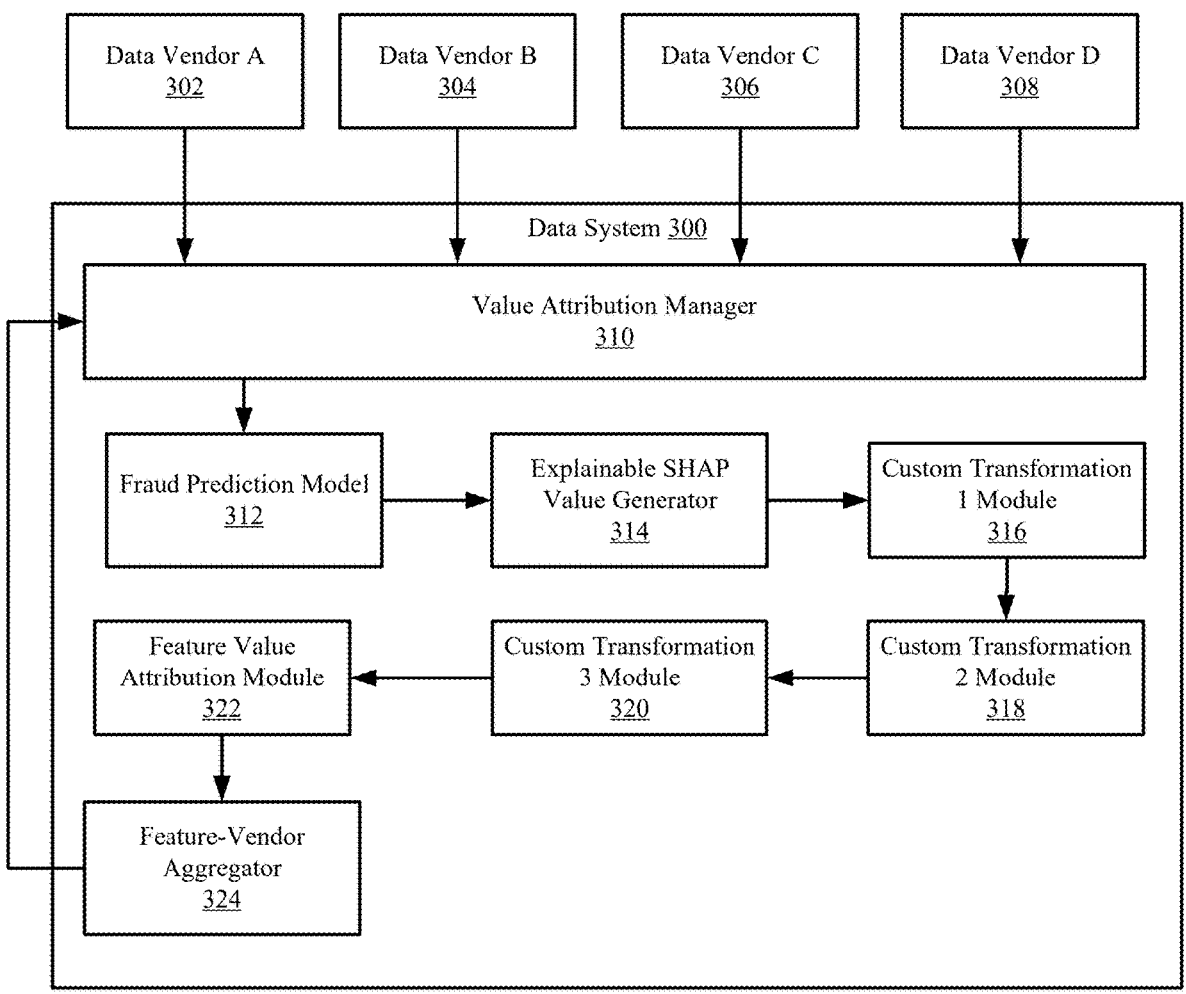
FIG. 3 shows an example system in accordance with one or more embodiments of the invention.

To further clarify embodiments of the invention described throughout this disclosure, a non-limiting example is provided in FIG. 3.

Example

Consider a scenario in which a group of data vendors provide client data to a data system associated with managing purchase transactions between clients and a business associated with the data system.

Turning to FIG. 3, FIG. 3 shows a diagram of an example system in accordance with one or more embodiments of the invention and the aforementioned scenario. The example system includes a data system (300) and four data vendors (302, 304, 406, 308). FIG. 3 further illustrates the flow of data in accordance with one or more embodiments of the invention via arrows between the data vendors (302, 304, 306, 308) and various components of the data system (300).

Turning to the description of the aforementioned flow of data, each data vendor (302, 304, 306, 308) provides order data associated with the purchase transactions that includes information about the orders and/or the one or more clients making the purchase transactions. The order data is provided to the data system (300), as represented by arrows pointing to the value attribution manager (310). The order data provided to the value attribution manager (310) may be different for each data vendor (302, 304, 306, 308). For example, data vendor A (302) may include features such as email addresses for accounts using each client device, an email address used for each order, and a risk score generated by data vendor A (302) for a given order. Data vendor B (304) may provide a different risk score for each order generated internally by data vendor B (304). Similarly, data vendors C (306) and D (308) provide their own risk scores for each order and their own features for each order. The risk scores may be generated, for example, via internal classification models (not shown) of the data vendors (302, 304, 306, 308) using their respective computing resources (not shown).

The value attribution manager (310) performs at least a portion of the method of FIGS. 2.1-2.2 and applies the order data to a fraud prediction model (312). The fraud prediction model (312) applies all the features included in the order data, and for each order, generates a fraud classification prediction associated with each order. The fraud classification prediction specifies a determination about whether the order is deemed fraudulent, and further includes a degree of certainty. The fraud classification predictions and each feature associated with each order is applied to an explainable SHAP value generator (334) that generates an explainability plot for each order. The explainability plot of an order includes a set of localized SHAP values (also referred to as SHAP values), each corresponding to a feature of the order and collectively contributing to the fraudulent classification prediction of the order.

The set of SHAP values for each order is applied to each of three custom transformation modules (316, 318, 320). Custom transformation 1 module (316) corresponds to a first custom transformation described in step 222 of FIG. 2.2. Similarly, custom transformation 2 module (318) corresponds to a second custom transformation described in step 224 of FIG. 2.2, and custom transformation 2 module (318) corresponds to a third custom transformation described in step 226 of FIG. 2.2. Specifically, the features are transformed via the custom transformation modules (316, 318, 320) such that the features are converted in a log odds format to obtain contribution levels and filtered based on the contribution levels to obtain only features that positively contribute to deeming an order as fraudulent (in contrast, for example, to such features that would deem an order to not be fraudulent). Further, the features are processed such that their contribution levels are normalized relative to the filtered SHAP values of the other remaining features. Said another way, each feature corresponding to a filtered SHAP value is normalized to represent its relative impact compared to the other features of the filtered SHAP values to obtain normalized features. The normalized features may be presented as percentages of a contribution to a fraudulent classification prediction.

The normalized features are applied to a feature value attribution module (322) that uses the monetary value of the order (e.g., the amount of money that was to be transacted for a fraudulent order) and calculates a feature value attributed to each feature. The feature values are processed using a feature-vendor aggregator that uses vendor information to determine a corresponding data vendor (302, 304, 306, 308) for each feature, and based on the corresponding data vendors for each feature, calculate a vendor value for each vendor. The vendor value, in this example, represents a monetary return on investment based on the money saved from providing features used to detect fraudulence and further based on the monetary costs to obtain such features from the respective data vendors (302, 304, 306, 308). In this example, the return on investment for a data vendor (302, 304, 306, 308) is represented as a ratio of the saved money by the data vendor to the aforementioned cost to obtain the order data by the data vendor. Based on the obtained vendor values, the value attribution manager (310) may remediate the operation of data collection by reallocating resources such as monetary funds to the data vendors (302, 304, 306, 308) such that the data vendors with the higher vendor values are utilized more for future feature collection of order data, and conversely, the data vendors with the relatively lower vendor values are utilized less, and less funds are allocated to these data vendors.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments disclosed herein include a solution for attributing value to data vendors that provide order data used for fraud prediction. Each data vendor, operating on a computing device, collects the order data based on resources provided by the data system. The value of the order data used for fraud detection may be used for determining the amount of resources to be provided to each data vendor. In a computing environment with limited resources, the determination of resource allocation may provide an efficient system of data collection and analysis.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing value attribution in a data system, the method comprising:

obtaining, by the data system, order data associated with a plurality of data vendors, wherein the order data comprises features about client devices and about a set of orders;

in response to obtaining the order data:

applying the features in the order data to a classification model to obtain fraud prediction models;

performing an explainable mechanism on the fraud classification predictions and the features using a shapley additive explanation (SHAP) to obtain localized SHAP values each corresponding to one of the features;

applying a set of custom transformations to the localized SHAP values to obtain normalized features;

applying a value attribution algorithm on the normalized features using vendor information associated with the features and the plurality of data vendors to obtain vendor values each associated with one of the plurality of data vendors;

performing a vendor remediation on the plurality of data vendors based on the obtained vendor values, wherein the vendor remediation comprises increasing or decreasing resources applied to each of the data vendors based on the vendor values, and wherein the resources of each of the data vendors comprise memory and network bandwidth applied by the data system for the each of the data vendors, and wherein the resources are increased and decreased based on limiting communication with each data vendor on a granular level.

2. The method of claim 1, wherein the set of custom transformations comprises:

a first custom transformation that comprises calculating a contribution level for each feature of the localized SHAP values;

a second custom transformation that comprises filtering the localized SHAP values based on the contribution level to obtain filtered SHAP values;

a third custom transformation that comprises calculating a relative contribution of each of the filtered SHAP values to obtain the normalized features.

3. The method of claim 2, wherein the contribution level is calculated using a log odds function on each feature of the localized SHAP values.

4. The method of claim 1, wherein the localized SHAP values are represented using an explainability plot.

5. The method of claim 1, wherein the vendor remediation further comprises removing resources applied to a data vendor of the plurality of data vendors based on a low vendor value of the data vendor.

6. The method of claim 1, wherein the vendor remediation further comprises increasing resources applied to a data vendor of the plurality of data vendors based on a high vendor value of the data vendor.

7. The method of claim 1, wherein the features are each generated by one of the plurality of data vendors.

8. A non-transitory computer readable medium comprising computer readable program code, which when executed by a computer processor enables the computer processor to perform a method for managing value attribution in a data system, the method comprising:

obtaining, by the data system, order data associated with a plurality of data vendors, wherein the order data comprises features about client devices and about a set of orders;

in response to obtaining the order data:

applying the features in the order data to a classification model to obtain fraud prediction models;

performing an explainable mechanism on the fraud classification predictions and the features using a shapley additive explanation (SHAP) to obtain localized SHAP values each corresponding to one of the features;

applying a set of custom transformations to the localized SHAP values to obtain normalized features;

applying a value attribution algorithm on the normalized features using vendor information associated with the features and the plurality of data vendors to obtain vendor values each associated with one of the plurality of data vendors;

performing a vendor remediation on the plurality of data vendors based on the obtained vendor values, wherein the vendor remediation comprises increasing or decreasing resources applied to each of the data vendors based on the vendor values, and wherein the resources of each of the data vendors comprise memory and network bandwidth applied by the data system for the each of the data vendors, and wherein the resources are increased and decreased based on limiting communication with each data vendor on a granular level.

9. The non-transitory computer readable medium of claim 8, wherein the set of custom transformations comprises:

a first custom transformation that comprises calculating a contribution level for each feature of the localized SHAP values;

a second custom transformation that comprises filtering the localized SHAP values based on the contribution level to obtain filtered SHAP values;

a third custom transformation that comprises calculating a relative contribution of each of the filtered SHAP values to obtain the normalized features.

10. The non-transitory computer readable medium of claim 9, wherein the contribution level is calculated using a log odds function on each feature of the localized SHAP values.

11. The non-transitory computer readable medium of claim 8, wherein the localized SHAP values are represented using an explainability plot.

12. The non-transitory computer readable medium of claim 8, wherein the vendor remediation further comprises removing resources applied to a data vendor of the plurality of data vendors based on a low vendor value of the data vendor.

13. The non-transitory computer readable medium of claim 8, wherein the vendor remediation further comprises increasing resources applied to a data vendor of the plurality of data vendors based on a high vendor value of the data vendor.

14. The non-transitory computer readable medium of claim 8, wherein the features are each generated by one of the plurality of data vendors.

15. A system, comprising:

a processor; and memory including instructions, which when executed by the processor, perform a method comprising:

obtaining order data associated with a plurality of data vendors, wherein the order data comprises features about client devices and about a set of orders;

in response to obtaining the order data:

applying the features in the order data to a classification model to obtain fraud prediction models;

performing an explainable mechanism on the fraud classification predictions and the features using a shapley additive explanation (SHAP) to obtain localized SHAP values each corresponding to one of the features;

applying a set of custom transformations to the localized SHAP values to obtain normalized features;

applying a value attribution algorithm on the normalized features using vendor information associated with the features and the plurality of data vendors to obtain vendor values each associated with one of the plurality of data vendors;

performing a vendor remediation on the plurality of data vendors based on the obtained vendor values, wherein the vendor remediation comprises increasing or decreasing resources applied to each of the data vendors based on the vendor values, and wherein the resources of each of the data vendors comprise memory and network bandwidth applied by the data system for the each of the data vendors, and wherein the resources are increased and decreased based on limiting communication with each data vendor on a granular level.

16. The system of claim 15, wherein the set of custom transformations comprises:

a first custom transformation that comprises calculating a contribution level for each feature of the localized SHAP values;

a second custom transformation that comprises filtering the localized SHAP values based on the contribution level to obtain filtered SHAP values;

a third custom transformation that comprises calculating a relative contribution of each of the filtered SHAP values to obtain the normalized features.

17. The system of claim 16, wherein the contribution level is calculated using a log odds function on each feature of the localized SHAP values.

18. The system of claim 15, wherein the localized SHAP values are represented using an explainability plot.

19. The system of claim 15, wherein the vendor remediation further comprises removing resources applied to a data vendor of the plurality of data vendors based on a low vendor value of the data vendor.

20. The system of claim 15, wherein the vendor remediation further comprises increasing resources applied to a data vendor of the plurality of data vendors based on a high vendor value of the data vendor.

* * * * *